United States Patent Office 3,090,782

Patented May 21, 1963

3,090,782

PROCESS FOR THE PRODUCTION OF CYANINE DYESTUFFS

Max Coenen, Gruiten, Rhineland, Oskar Weissel, Krefeld-Urdingen, and Walter Wunder, Leverkusen, Germany, assignors to Farbenfabriken Bayer Aktiengesellschaft, Leverkusen, Germany, a corporation of Germany No Drawing. Filed Mar. 4, 1959, Ser. No. 797,057
Claims priority, application Germany Mar. 6, 1958
7 Claims. (Cl. 260—240.6)

The present invention is concerned with new cyanine dyestuffs and with a process for the production thereof.

It is known to produce cyanine dyestuffs having a cyano radical (—C≡N) in the alpha position on the methine chain by reacting quaternary cyclic ammonium salts, which contain in the reactive position a thio-ether, a seleno-ether or a substituted or unsubstituted amino group, in the presence of condensing agents which are usually basic, with either N-substituted heterocyclic cyanomethylene compounds or their salts or reacting them with unsubstituted cyanomethylene heretrocyclic compounds and quaternizing the thus formed cyanine bases.

We have now found that cyanine dyestuffs, the methine (methylidyne) chain of which is substituted by at least one cyano group, can be produced in a technically simple manner and usually with excellent yields by reacting an aldehyde of the general formula:

(I)

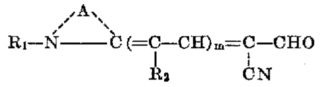

wherein A are supplementary members of an indolenine ring system, $R_1$ is a saturated alkyl radical with up to 18 carbon atoms, $R_2$ is a substituent selected from the group consisting of (*a*) hydrogen, cyano, a lower alkoxycarbonyl radical (R—O—OC—), the alkoxy radical of which contains not more than 4 carbon atoms, or a carbamoyl ($NH_2CO$—) or an alkylcarbamoyl or arylcarbamoyl (R—NH—CO—) radical, or (*b*) a lower alkanoyl (R—CO—) radical having not more than 4 carbon atoms, or a benzoyl radical, and *m* is zero or the integer 1, with a compound of the general formula:

(II) T-X wherein X is a radical selected from the group consisting of (*a*) a radical of the general formula:

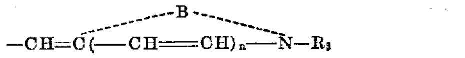

(*b*) a radical of the general formula:

—D—$R_4$ (*c*) a radical of the general formula:

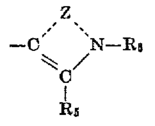

(*d*) a radical of the general formula:

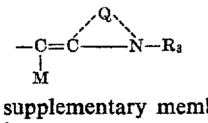

wherein B are the supplementary members of a 5 or 6-atom heterocyclic ring system, D is a phenylene radical, Z are the supplementary members of an indole ring system, M has the same significance as $R_2$, Q are the supplementary members of a heterocyclic ring system selected from the group consisting of indoline and benzothiazole ring systems, $R_3$ is a saturated alkyl radical with up to 18 carbon atoms, $R_4$ is an auxochrome group, $R_5$ is a saturated alkyl radical with up to 4 carbon atoms, or a phenyl group, $R_6$ is a hydrogen atom or a saturated alkyl radical with up to 4 carbon atoms, and *n* is zero or the integer 1, in the presence of an acidic condensing agent.

More particularly, in Formula I the group

may be, for instance,

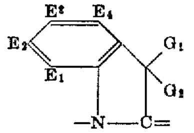

wherein $E_1$, $E_2$, $E_3$, and $E_4$ may be, for instance, —H, —F, —Cl, —Br, —I, —$CH_3$, —$CF_3$, —$C_2H_5$ —$C_3H_7$, —$C_4H_9$, —$C_6H_5$(phenyl), —$OCH_3$, —$OC_2H_5$ —$OC_3H_7$, —$OC_4H_9$, —$OC_6H_5$(phenoxy),—$SCH_3$ —$SC_2H_5$, —$SC_3H_7$, —$SC_4H_9$, —$SC_6H_5$(phenylthio) —$N(CH_3)_2$, —$N(C_2H_5)_2$ —$N(CH_3)(C_6H_5)$(methylphenylamino) —$N(C_2H_5)(C_2H_4CN)$, —$N(C_4H_9)(C_2H_4Cl)$ —$NHCOCH_3$, —$NHCOC_2H_5$ —$NHCOC_6H_5$(phenylcarbonylamino) —$NHSO_2C_6H_5$(phenylsulfonamido), —COOH, —CN —$COOCH_3$, —$COOC_2H_5$, —$COOC_3H_7$, —$COOC_4H_9$ —$COOC_6H_5$(phenoxycarbonyl), —$CONHCH_3$ —$CONHC_2H_5$, —$CONHC_3H_7$, —$CONHC_4H_9$ —$CONHC_6H_5$(phenylaminocarbonyl), —$SO_2NHC_2H_5$ $NO_2$; $G_1$ and $G_2$ may be, for instance, —$CH_3$, —$C_2H_5$, —$C_3H_7$, —$C_4H_9$, —$C_6H_5$(phenyl); the group

further may be, for instance,

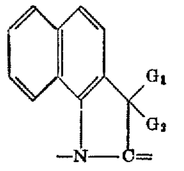

wherein $G_1$ and $G_2$ have the same significance as above.

In Formula II the group

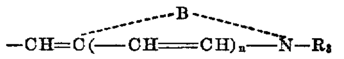

may be, for instance,

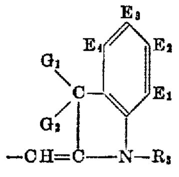

or

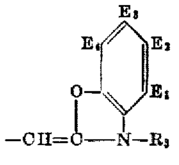

or

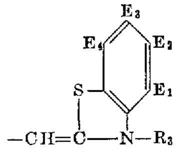

or

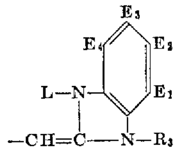

or

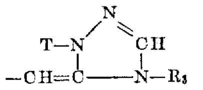

or

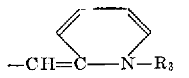

or

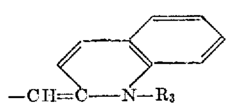

or

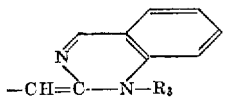

or

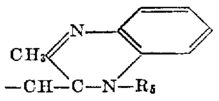

or

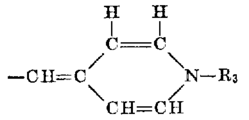

or

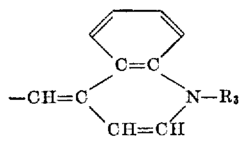

The group —D—$R_4$ may be, for instance

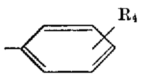

The group

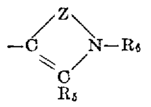

may be, for instance,

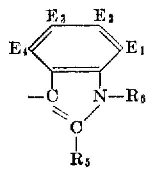

$R_1$ in Formula I, and $R_3$, L and T in Formula II may be, for instance, —$CH_3$, —$C_2H_5$, —$C_3H_7$, —$C_4H_9$, —$C_5H_{11}$, and so on to $C_{18}H_{37}$.

$R_2$ in Formula I may be, besides the significance already specified hereinbefore, for instance, —$COOCH_3$, —$COOC_2H_5$, —$COOC_3H_7$, —$COOC_4H_9$, —$CONH_2$,

—$CONHCH_3$, —$CON(CH_3)_2$, —$CONHC_2H_5$,

—$CON(C_2H_5)_2$, —$CONHC_6H_5$ (phenylaminocarbonyl), —$COCH_3$, —$COC_2H_5$, —$COC_4H_9$.

$R_4$ in Formula II may be, for instance, —$OCH_3$,

—$OC_2H_5$, —$OC_3H_7$, —$OC_4H_9$, —$N(CH_3)_2$, —$N(C_2H_5)_2$,

—$N(C_2H_5)(C_2H_4CN)$, —$N(C_2H_5)(C_2H_4Cl)$

—$N(C_4H_9)(C_2H_4Cl)$, —$N(CH_3)(C_6H_5)$ (methylphenylamino), —$N(C_2H_5)(C_6H_5)$ (ethylphenylamino) —$N(CH_3)(C_6H_4OCH_3)$ (methylmethoxyphenylamino).

$R_5$ and $R_6$ in Formula II may be, besides the significance given above, for instance, —$CH_3$, —$C_2H_5$, —$C_3H_7$, and $C_4H_9$.

Suitable aldehydes of the mentioned type are, for example, 1,3,3-trimethyl-2-cyanomethylene-inodoline-ω-aldehyde,
1,3,3-trimethyl-5-chloro-2-cyanomethylene-indoline-ω-aldehyde,
1,3,3-trimethyl-5-methyl-2-cyanomethylene-indoline-ω-aldehyde,
1,3,3-trimethyl-5-ethoxy-2-cyanomethylene-indoline-ω-aldehyde,
1,3,3-trimethyl-5-phenyl-2-cyanomethylene-indoline-ω-aldehyde,
1,3,3-trimethyl-5-carbomethoxy-2-cyanomethylene-indoline-ω-aldehyde,
1,3-dimethyl-3-ethyl-2-cyanomethylene-indoline-ω-aldehyde,
1-ethyl-3,3-dimethyl-5-methoxy-2-cyanomethylene-indoline-ω-aldehyde,
1-octadecyl-3,3-dimethyl-2-cyanomethylene-indoline-ω-aldehyde,
1,3,3-trimethyl-5-dimethylamino-2-cyanomethylene-indoline-ω-aldehyde,
1,3,3-trimethyl-5,7-dimethoxy-2-cyanomethylene-indoline-ω-aldehyde,
1,3,3,5,6-pentamethyl-2-cyanomethylene-indoline-ω-aldehyde,
1,3,3-trimethyl-4-methoxy-7-methyl-2-cyanomethylene-indoline-ω-aldehyde,
1,3,3-trimethyl-6,7-benzo-2-cyanomethylene-indoline-aldehyde,
1,3,3-trimethyl-2(α,γ-dicyanopropenylidene)-indoline-ω-aldehyde and
1,3,3-trimethyl-2-(γ-cyanopropenylidene)indoline-ω-aldehyde.

Such aldehydes are obtainable, for example, by the action of N-methyl formanilide in the presence of phosphorus oxychloride on the corresponding cyanomethylene indoline derivatives, for examples, by the process described in U.S. patent application Serial No. 737,474, filed May 26, 1958, now U.S. Patent No. 2,957,005.

Suitable methylene bases of the hereinbefore specified type are, for example, 1,3,3-trimethyl-2-methylene-indoline,
1,3,3-trimethyl-5-chloro-2-methylene-indoline,
1,3,3-trimethyl-5-methyl-2-methylene-indoline,
1,3,3-trimethyl-5-ethoxy-2-methylene-indoline,
1,3,3-trimethyl-5-phenyl-2-methylene-indoline,
1,3,3-trimethyl-5-carbomethoxy-2-methylene-indoline,
1,3-dimethyl-3-ethyl-2-methylene-indoline,
1-ethyl-3,3-dimethyl-5-methoxy-2-methylene-indoline,
1-octadecyl-3,3-dimethyl-2-methylene-indoline,
1,3,3-trimethyl-5-dimethylamino-2-methylene-indoline,
1,3,3-trimethyl-5,7-dimethoxy-2-methylene-indoline,
1,3,3,5,6-pentamethyl-2-methylene-indoline, 1,3,3-trimethyl-4-methoxy-7-methyl-2-methylene-indoline,
1,3,3-trimethyl-6,7-benzo-2-methylene-indoline,
1,3,3-trimethyl-2-cyanomethylene-indoline,
1,3,3-trimethyl-5-chloro-2-cyanomethylene-indoline,
1,3,3-trimethyl-5-methyl-2-cyanomethylene-indoline,
1,3,3-trimethyl-5-ethoxy-2-cyanomethylene-indoline,
1,3,3-trimethyl-5-phenyl-2-cyanomethylene-indoline,
1,3,3-trimethyl-5-carbomethoxy-2-cyanomethylene-indoline,
1,3-dimethyl-3-ethyl-2-cyanomethylene-indoline,
1-ethyl-3,3-dimethyl-5-methoxy-2-cyanomethylene-indoline,
1-octadecyl-3,3-dimethyl-2-cyanomethylene-indoline,
1,3,3-trimethyl-5-dimethylamino-2-cyanomethylene-indoline,
1,3,3-trimethyl-5,7-dimethoxy-2-cyanomethylene-indoline,
1,3,3,5,6-pentamethyl-2-cyanomethylene-indoline,
1,3,3-trimethyl-4-methoxy-7-methyl-2-cyanomethyl-ene-indoline, and 1,3,3-trimethyl-6,7-benzo-2-cyano-methylene-indoline.

Suitable reactive indoles are, for example, 1-methyl-2-phenyl-indole and 2-methyl-indole. As examples of suitable quaternary cyclic ammonium salts there may be mentioned 2,3-dimethyl-benzthiazolinium salts.

The mentioned cyanomethylene bases can be obtained, for example, by the action of cyanogen halides on the corresponding methylene indoline derivatives, for example, by the process described in U.S. patent application Serial No. 735,992, filed May 19, 1958, now U.S. Patent No. 2,993,907.

As acidic condensing agents there are advantageously used inorganic acid chlorides, such as phosphorus oxychloride or thionyl chloride. Further suitable acidic condensing agents are organic acid chlorides and anhydrides, such as acetyl chloride and acetic anhydride, as well as concentrated mineral acids, such as sulphuric acid and phosphoric acid. In some cases it is recommended to use glacial acetic acid-triethylamine as the condensing agent.

Suitable solvents are, for example, aromatic; aliphatic and cycloaliphatic hydrocarbons, such as benzene, ligroin and cyclohexane, aliphatic, araliphatic and aromatic ethers, chlorinated aliphatic and aromatic hydrocarbons, such as chloroform and chlorobenzene, aliphatic ketones, such as acetone, as well as low molecular weight fatty acids, such as acetic acid.

The reaction usually proceeds even at room temperature. In other cases it can be advantageous to increase the temperature somewhat to, for example, 40–100° C.

A smooth reaction of this type of the aldehydes to be used according to the invention of the Formula I with compounds of the Formula II was not to be foreseen since it was to be expected that the reactivity of the aldehyde group would be strongly influenced by the cyano group present on the same carbon atom in the same manner as the methylene hydrogen in the cyanomethylene-indolines obtainable by the process according to U.S. Patent Application Serial. No. 735,992, methylene hydrogen of which is frequently inert in the case of many reactions due to the cyano $\theta$ group present so that, for example, alkylations or acylations were not successful.

According to the invention new dyestuffs of the general formula may be obtained.

(III)

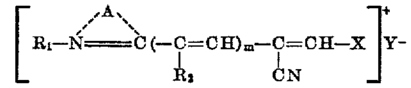

wherein A, X, $R_1$, $R_2$ and $m$ have the same significance as mentioned above and $Y^-$ is an anion, for instance, Cl′, Br′, J′, $SO_4''$, $NO_3'$, $H_2PO_4'$, $HPO_4''$, $ClO_4'$, $CH_3COO'$, $C_2H_5COO'$, $CCl_3COO'$, $C_6H_5SO_3'$, $(CH_3)C_6H_4SO_3'$, $CH_3OSO_3'$, and $C_2H_5OSO_3'$ A special class of new dyestuffs of the kind mentioned above corresponds to the following formula:

(IV)

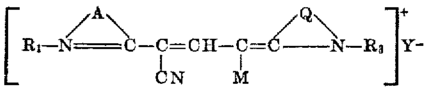

wherein A, M, Q, $R_1$, $R_3$ and $Y^-$ have the significance as described above.

Specific preferred examples of compounds conforming to this formula, whose preparations and uses are described respectively in Examples 17, 16, 11, 10, and 19, are the following:

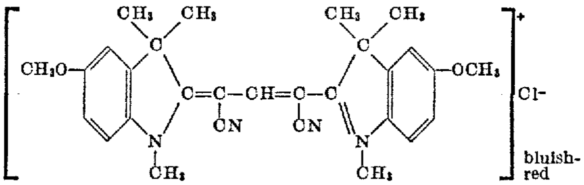

bluish-red

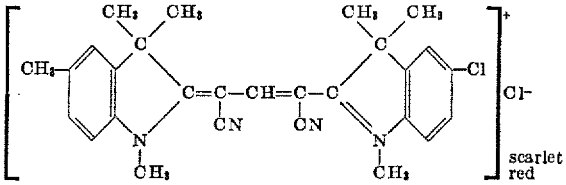

scarlet red

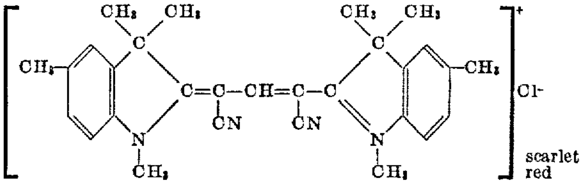

scarlet red

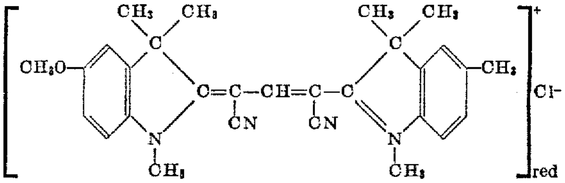

red

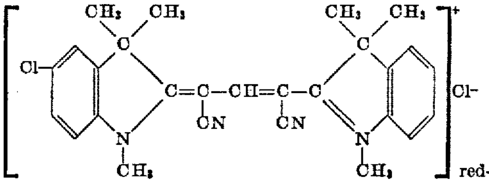

red-orange

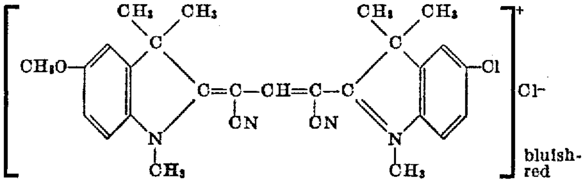

bluish-red

The dyestuffs obtainable according to the invention are in the same way as the already known cyanine dyestuffs, valuable sensitizers for photographic silver halide emulsions. Furthermore they are suitable for dyeing and printing materials such as fibres, threads, strips and woven materials, made from polyacrylonitrile, acrylonitrile-containing mixed polymers or acetate rayon.

The dyeings and printings obtained with the dyestuffs according to the invention on these materials are characterized by very good fastness and especially by excellent stability to light and are clearly superior, in this respect, to the already known dyestuffs of the Astraphloxine type that are devoid of cyano radicals.

It is known that the cyano group attached to the methine chain is saponified very quickly and completely by heating in an aqueous acid medium. Since the free carboxylic acids which result are immediately decarboxylated under the reaction conditions, compounds devoid of cyano radicals can be very easily produced in this manner.

Not only the rapid ability to hydrolyze of the cyano group but also the instability to light that is to be expected with the sensitizing effect appeared to exclude the use of these dyestuffs for the dyeing of textiles, for instance.

It was, therefore, surprising, that the dyestuffs according to the invention, containing cyano groups, are suitable for printing and dyeing material such as those specified above.

The dye baths and printing pastes can contain the usual additives, including levelling agents, such as substituted polyglycol ethers, condensation products of aromatic sulpho acids or condensation products of high molecular weight aliphatic amines with ethylene oxide, or dispersion agents, such as fatty alcohol sulphonates, condensation products of high molecular weight alcohols and ethylene oxide or cellulose sulphite waste liquor products.

One can dye and print with these dyestuffs by the usual methods, for example, by boiling the materials to be dyed in aqueous dye baths, optionally with the addition of acids, or by treating the materials with printing pastes containing the dyestuffs, and subsequently steam treating.

The following examples are given for the purpose of illustrating the invention:

*Example 1*

Production of 2-(1,3,3,5-tetramethyl-indole)-2'-(1',3',3',5'-tetramethyl-indole)-α-cyano-trimethinecyanine chloride.

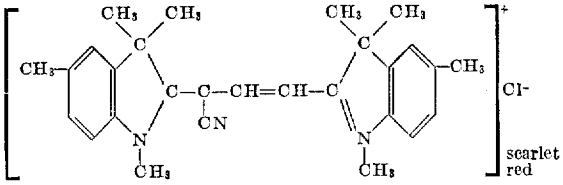

A mixture of 120 grams 1,3,3,5-tetramethyl-2-cyanomethylene-indoline-ω-aldehyde, 93.5 grams 1,3,3,5-tetramethyl-2-methylene-indoline and 200 milliliters chloroform are heated to boiling and 75 grams phosphorus oxychloride added dropwise in the course of 25 minutes. The reaction mixture is subsequently heated under reflux for a further 15 minutes, evaporated to dryness and the residual crude dyestuff recrystallized from water. Metallic shining crystals are obtained. Yield: 181 grams, color of solution in water: scarlet red.

*Example 2*

Production of 2-(1,3,3-trimethyl-5-methoxy-indole)-2'-(1',3',3'-trimethyl-indole)-α-cyano - trimethine - cyanine chloride.

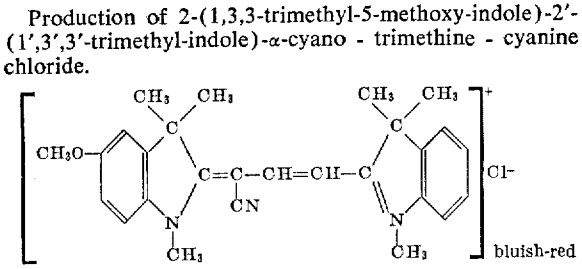

A mixture of 12.8 grams 1,3,3-trimethyl-5-methoxy-2-cyanomethylene-indoline-ω-aldehyde, 8.7 grams 1,3,3-trimethyl-2-methylene-indoline and 20 milliliters chloroform is mixed in the course of 2 minutes with 7.5 grams phosphorus oxychloride. The mixture automatically warms up to boiling point. It is boiled under reflux for an additional period of 5 minutes, then evaporated to dryness and the residual crude dyestuff recrystallized from water. Crystals having a metallic sheen are obtained. Yield: 22.0 grams, color of solution in water: bluish-red.

*Example 3*

Production of 2-(1,3,3-trimethyl-5-methoxy-indole)-2'-(1',3',3'-trimethyl-5'-methoxy-indole)-α-cyano-trimethine-cyanine chloride.

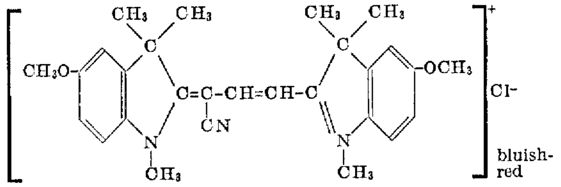

12.8 grams 1,3,3-trimethyl-5-methoxy-2-cyanomethylene-indoline-ω-aldehyde, 10.2 grams 1,3,3-trimethyl-5-methoxy-2-methylene-indoline and 7.5 grams phosphorus oxychloride are reacted in the presence of 20 milliliters chloroform in the same manner as in Example 2. Greenish shining crystals are obtained. Yield: 19.2 grams, color of solution in water: bluish-red.

*Example 4*

Production of 2-(1,3,3-trimethyl-5-chloro-indole)-2'-(1',3',3'-trimethyl - 5' - chloro - indole)-α-cyano-trimethine-cyanine chloride.

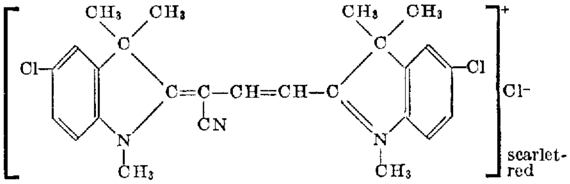

13.0 grams 1,3,3-trimethyl-5-chloro-2-cyanomethylene-indoline-ω-aldehyde, 10.4 grams 1,3,3-trimethyl-5-chloro-2-methylene-indoline, 7.6 grams phosphorus oxychloride and 40 milliliters chloroform are heated together under reflux for 30 minutes. The reaction mixture is evaporated to dryness. The so-obtained crude dyestuff is boiled with 50 milliliters water, filtered and washed with water. A brown powder is obtained. Yield: 25.7 grams, color of solution in water: scarlet-red.

*Example 5*

Production of 2-(1,3,3 - trimethyl-5-carbomethoxy-indole)-2'-(1',3',3'-trimethyl - indole)-α-cyano - trimethine-cyanine chloride.

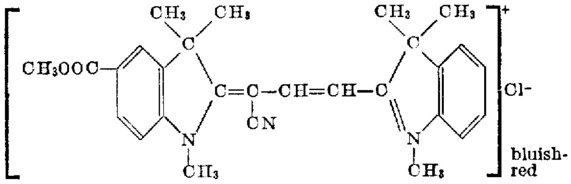

17.1 grams of dyestuff are obtained when 13.1 grams 1,3,3-trimethyl-5-carbomethoxy-2-cyanomethylene - indoline-ω-aldehyde and 8.7 grams 1,3,3-trimethyl-2-methylene-indoline were reacted and recovered in the same manner as described in Example 2. A fine crystalline powder is obtained. Color in methanol: bluish-red.

*Example 6*

Production of 2-(1,3,3-trimethyl-5,7-dimethoxy-indole)-2'-(1',3',3'-trimethyl - 5' - chloro - indole)-α-cyano-trimethine-cyanine chloride.

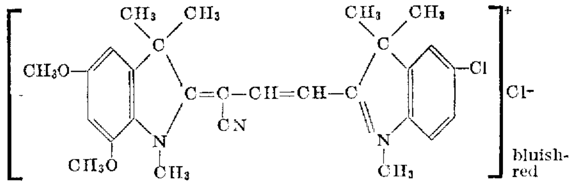

By the reaction of 6.8 grams 1,3,3-trimethyl-5,7-dimethoxy-2-cyanomethylene-indoline-ω-aldehyde and 5.2 grams 1,3,3-trimethyl-2-methylene-indoline in accordance with the method described in Example 2 there is obtained 8.6 grams of dyestuff. This is a brown powder. Color in methanol: bluish-red.

*Example 7*

Production of 2-(1,3,3,5,6-pentamethyl-indole)-2'-(1',3',3'-trimethyl-5'-carbomethoxy - indole)-α-cyanotrimethine-cyanine chloride.

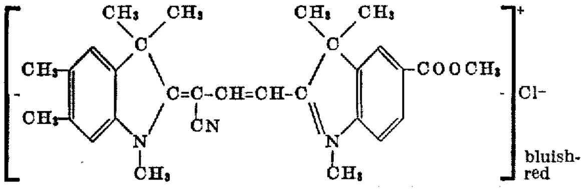

By the reaction of 6.6 grams 1,3,3,5,6-pentamethyl-2-cyanomethylene-ω-aldehyde and 5.7 grams 1,3,3-trimethyl-5-carbomethoxy-2-methylene-indoline in accordance with the method described in Example 2, 7.8 grams of dyestuff are obtained. This is a fine crystalline powder. Color in methanol: bluish-red.

*Example 8*

Production of 2-(1-ethyl-3,3-dimethyl-5-methoxy-indole)-2'-(1'-ethyl-3',3'-dimethyl - 5' - methoxy-indole)-α-cyano-trimethine-cyanine chloride.

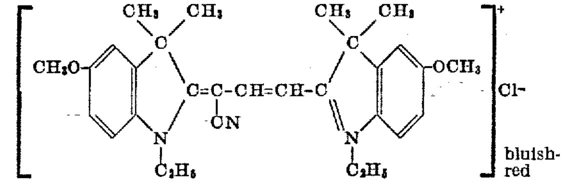

By the reaction of 6.8 grams 1-ethyl-3,3-dimethyl-5-methoxy-2-cyanomethylene-indoline-ω-aldehyde with 5.5 grams 1-ethyl-3,3-dimethyl - 5 - methoxy-2-methylene-indoline according to the method described in Example 2, 9.5 grams of dyestuff are obtained. This is in the form of metallic shining crystals. Color in methanol: bluish-red.

*Example 9*

Production of 2-(1,3,3-trimethyl-5-phenyl-indole)-2'-(1',3',3'-trimethyl - 5' - methoxy-indole)-α-cyano-trimethine-cyanine chloride.

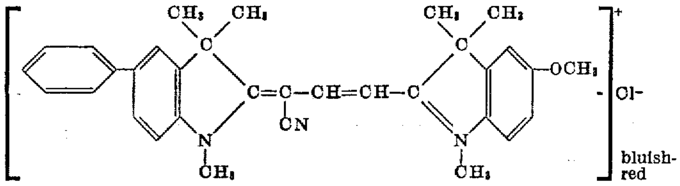

By the reaction of 7.6 grams 1,3,3-trimethyl-5-phenyl-2-cyano-methylene-indoline-ω-aldehyde with 5.1 grams 1,3,3-trimethyl-5-methoxy-2-methylene - indoline according to the method described in Example 2, 9.7 grams of dyestuff are obtained. This is a brown crystalline powder. Color in methanol: bluish-red.

*Example 10*

Production of 2-(1,3,3-trimethyl-5-chloro-indole)-2'-(1',3',3'-trimethyl-indole)-α-γ-dicyano - trimethine - cyanine chloride.

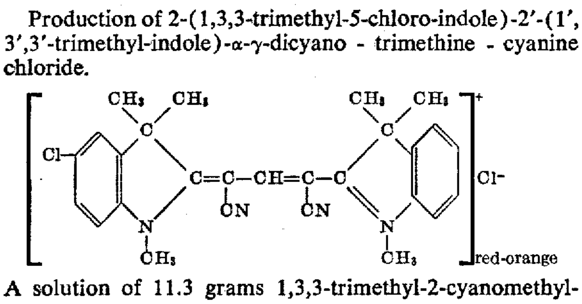

A solution of 11.3 grams 1,3,3-trimethyl-2-cyanomethylene-indoline-ω-aldehyde and 11.6 grams 1,3,3-trimethyl-5-chloro-2-cyanomethylene-indoline in 100 milliliters benzene is mixed with 6.0 grams thionyl chloride and heated under reflux for 10 minutes. After cooling the dyestuff formed is filtered off with suction and washed with benzene. The dyestuff is in the form of red-brown crystals. Yield: 21.0 grams, color of the solution in water: red-orange.

*Example 11*

Production of 2-(1,3,3-trimethyl-5-methoxy-indole)-2'-(1',3',3',5'-tetramethyl-indole)-α-γ-dicyano-trimethine-cyanine chloride.

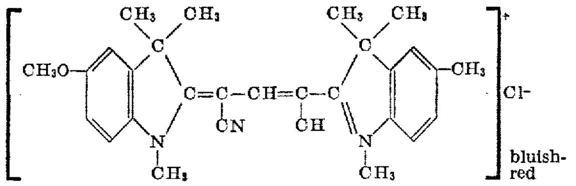

12.8 grams 1,3,3-trimethyl-5-methoxy-2-cyanomethylene-indoline-ω-aldehyde, 10.6 grams 1,3,3,5-tetramethyl-2-cyanomethylene-indoline and 6.0 grams thionyl chloride are reacted in the presence of 100 milliliters benzene in the manner described in Example 5. The dyestuff is obtained in the form of dark red crystals. Yield: 24.3 grams, color of solution in water: bluish-red.

*Example 12*

Production of 2-(1,3,3-trimethyl-indole)-2'-(1',3',3'-trimethyl-indole)-α,γ-dicyano-pentamethine-cyanine perchlorate.

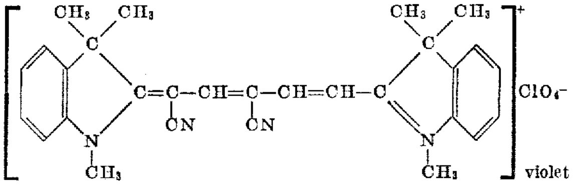

2.3 grams 1,3,3-trimethyl-2-(α,γ-dicyano-propenylidene)-indoline-ω-aldehyde, 1.5 grams 1,3,3-trimethyl-2-methylene-indoline, 1.3 grams phosphorus oxychloride and 35 milliliters chloroform are heated together under reflux for two hours. The reaction mixture is then evaporated to dryness. The residue is taken up in 150 milliliters methanol, filtered and mixed with 10 milliliters 10 percent ammonium perchlorate. The dyestuff perchlorate precipitates out as a blue powder. It is separated off and washed with isopropanol. Yield: 2.0 grams, color of solution in methanol: violet.

*Example 13*

Production of 2-(1,3,3-trimethyl-5-methoxy-indole)-2'-(3'-methyl-benzthiazole)-α-cyano - trimethine - cyanine methylsulphate.

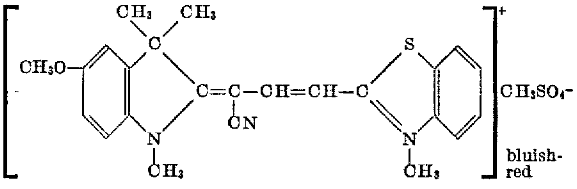

A mixture of 2.6 grams 1,3,3-trimethyl-5-methoxy-2-cyano-methylene-indoline-ω-aldehyde, 2.8 grams 2,3-dimethyl-benzthiazolium-methyl-sulphate, 1.0 gram triethylamine and 20 milliliters glacial acetic acid is heated under reflux for 15 minutes. The reaction mixture is then diluted with 50 milliliters hot water. After cooling, the dyestuff, which is obtained in the form of metallic shining crystals, is separated off. Yield: 4.1 grams, color of solution in methanol: bluish-red.

*Example 14*

Production of 2-(1,3,3-trimethyl-indole)-3′-(1′,-methyl-2′-phenyl-indole)-α-cyano-dimethine-cyanine perchlorate.

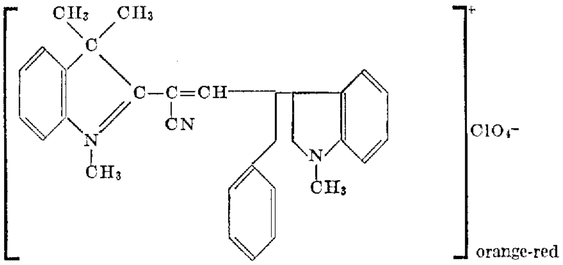

A solution of 10.0 grams 1,3,3-trimethyl-2-cyanomethylene-indoline-ω-aldehyde, 8.3 grams 1-methyl-2-phenyl-indole and 4 milliliters phosphorus oxychloride in 40 milliliters chloroform is heated under reflux for 60 minutes. The reaction mixture is then evaporated to dryness. The residual crude dyestuff is dissolved in 500 milliliters methanol and precipitated out as the perchlorate with 70 milliliters 10 percent ammonium prechlorate solution. The dyestuff perchlorate is separated off and washed with a little methanol. The dyestuff is a red-brown powder. Yield: 17.0 grams, color of solution in methanol: orange-red.

*Example 15*

Production of 2-(1,3,3-trimethyl-indole)-3′-(2′-methyl-indole)-α-cyano-dimethine-cyanine chloride.

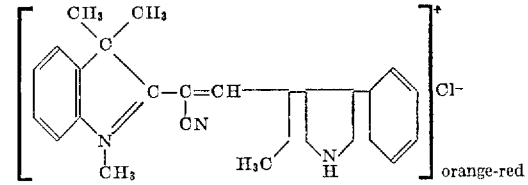

6.4 grams phosphorus oxychloride is added dropwise in the course of 5 minutes to a solution of 9.5 grams 1,3,3-trimethyl-2-cyanomethylene-indoline-ω-aldehyde and 5.5 grams α-methyl-indole in 50 milliliters chloroform. The reaction mixture is then heated under reflux for an additional period of 5 minutes and subsequently evaporated to dryness. The residue is preferably heated up with a little water. After cooling, the undissolved dyestuff is separated off. It is in the form of a brown powder. Yield: 13.1 grams, color of solution in methanol: orange-red.

*Example 16*

Production of 2-(1,3,3,5 - tetramethyl-indole)-2-(1′, 3′,3′,-trimethyl-5-chloroindole)-α,γ - dicyano-trimethine-cyanine-chloride.

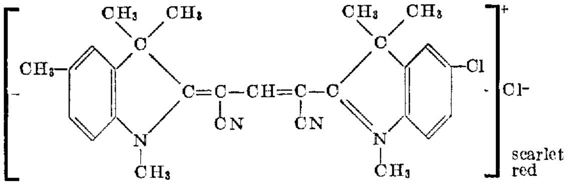

12.0 grams 1,3,3,5-tetramethyl - 2 - cyanomethylene- indoline-ω-aldehyde and 11.6 grams 1,3,3-trimethyl-5- chloro-2-cyanomethylene-indoline are dissolved in 50 milliliters hot benzene, and after cooling the solution 6.0 grams thionylchloride are added. The mixture automatically warms up to the boiling point. After a short time, the dyestuff precipitates. The mixture is diluted with 100 milliliters benzene, the precipitate is separated and washed with benzene. One obtains a light orange powder. Yield: 24.3 grams, color of solution in water is scarlet red.

*Example 17*

Production of 2-(1,3,3-trimethyl - 5 - methoxy-indole)-2′-(1′,3′,3′-trimethyl - 5′-methoxy-indole) - α,γ-dicyano-trimethine-cyanine-chloride.

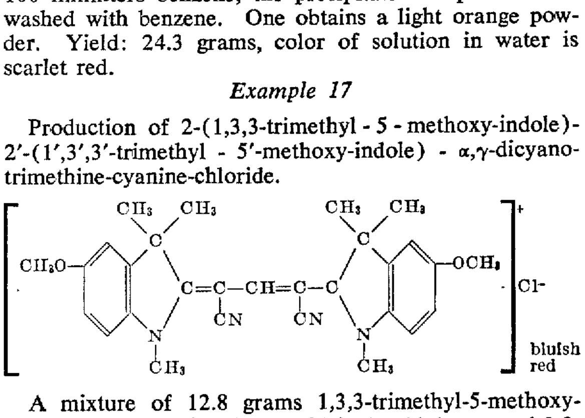

A mixture of 12.8 grams 1,3,3-trimethyl-5-methoxy-2-cyanomethylene-indoline-ω-aldehyde, 11.4 grams 1,3,3-trimethyl-5 - methoxy-2 - cyanomethylene-indoline, 7.7 grams phosphorus oxychloride and 20 milliliters chloroform are refluxed for 10 minutes. Then the chloroform and the unreacted phosphorus oxychloride are distilled off, first under atmospheric pressure and finally under reduced pressure. The remaining raw dyestuff is recrystallized in 800 milliliters water. On obtains a brown powder. Yield: 16.0 grams, solution color in water: bluish red.

*Example 18*

Production of 2-(1,3,3,5-tetramethyl-indole)-2′-(1′,3′,3′,5′-tetramethyl-indole) - α,γ-dicyano - trimethine-cyanine-chloride.

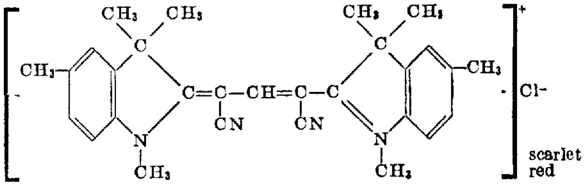

12.0 grams 1,3,3,5-tetramethyl-2 - cyanomethylene-indoline-ω-aldehyde, 10.6 grams 1,3,3,5-tetramethyl-2-cyano-methylene-indoline and 7.7 grams phosphorus oxychloride are reacted according to Example 17. The raw dyestuff is recrystallized in 350 milliliters water. One obtains a red powder. Yield: 13.6 grams, solution color in water is scarlet red.

The following examples demonstrate the dyeing process with some new dyestuffs.

*Example 19*

1 part by weight of the dyestuff of the formula:

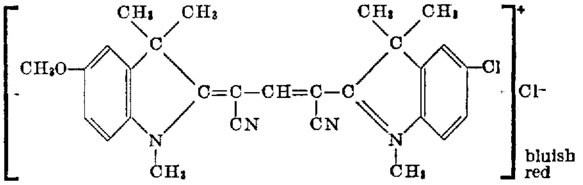

is dissolved in 300 parts by weight of water. 3 parts by weight 30% acetic acid and one part by weight sodium acetate are added to the solution. 100 parts by weight of a woven textile made from polyacrylonitrile or an acrylonitrile-containing mixed polymer are immersed in this dye solution at about 50° C., the temperature increased in the course of 20 to 30 minutes to boiling point and dyeing carried out at the boiling temperature for one to one and half hours. After washing and drying, a strong bluish-red dyed material is obtained, which possess excellent fastness and an exceptionally good stability to light.

Example 20

1 part by weight of the dyestuff having the formula whose preparation is described in Example 17 hereinbefore:

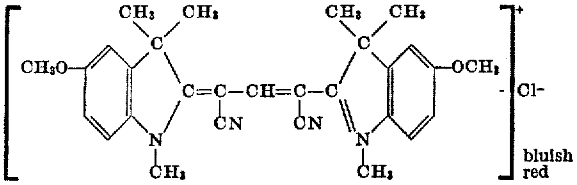

bluish red is dissolved in 3000 parts by weight of water and used in the manner described in Example 19 hereinbefore for dyeing 100 parts by weight of polyacrylonitrile thread, if desired with the addition of a levelling and/or dispersion agent. A material is obtained which is dyed with a clear bluish red and possesses very good fastness and an especially good light stability.

Example 21

1 part by weight of the dyestuff having the formula whose preparation is described in Example 18 hereinbefore:

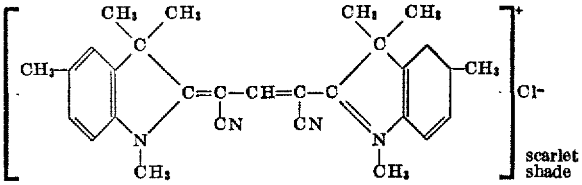

scarlet shade is dissolved in 3000 parts by weight of water. 100 parts by weight of material made from polyacrylonitrile or a mixed polymer containing acrylonitrile are placed on this dye solution at about 50° C., the temperature is increased within a period of 20 to 30 minutes to boiling point and maintained at this temperature for 1 to 1½ hours. After washing and drying, a material is obtained dyed with a very clear scarlet shade which possesses very good fastness and an excellent stability to light.

We claim:

1. A cyanine dyestuff of the formula

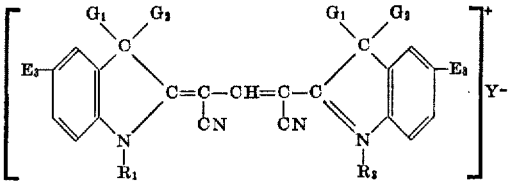

in which $R_1$, $R_3$, $G_1$, and $G_2$ are each lower alkyl,
$E_3$ is a radical of the group consisting of hydrogen, lower alkyl, lower alkoxy, and halogen, and
$Y^-$ is an anion.

2. A process for the production of a cyanine dyestuff which comprises mixing in an inert solvent in the presence of an acidic condensing agent at a temperature between room temperature and about 100° C., approximately equimolecular amounts of (*a*) a cyanomethyleneindoline carboxaldehyde of the formula

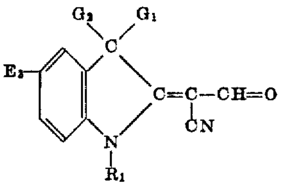

and (*b*) a 1,3,3-trialkyl-2-cyanomethyleneindoline of the formula

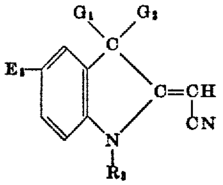

in which formulae $R_1$ and $R_3$ are each an alkyl radical having up to 18 carbon atoms,
$G_1$ and $G_2$ are each a radical of the group consisting of alkyl and phenyl, and
$E_3$ is a radical of the group consisting of hydrogen, lower alkyl, lower alkoxy, and halogen.

3. A cyanine dyestuff of the formula

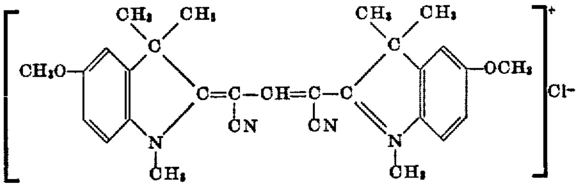

4. A cyanine dyestuff of the formula

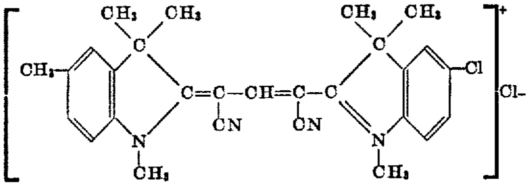

5. A cyanine dyestuff of the formula

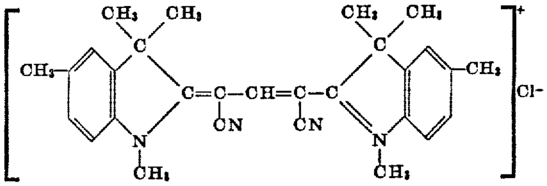

6. A cyanine dyestuff of the formula

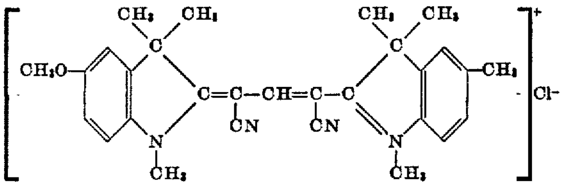

7. A cyanine dyestuff of the formula

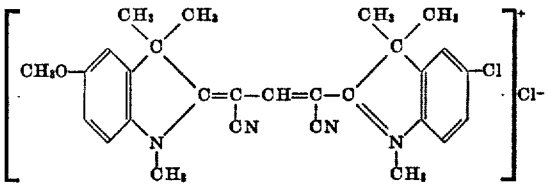

(References on following page)

References Cited in the file of this patent

UNITED STATES PATENTS

| | | |
|---|---|---|
| 2,158,287 | Konig | May 16, 1939 |
| 2,165,337 | Brooker | July 11, 1939 |
| 2,345,094 | Brooker et al. | Mar. 28, 1944 |
| 2,542,401 | Doyle et al. | Feb. 20, 1951 |
| 2,848,296 | Heller | Aug. 19, 1958 |
| 2,893,816 | Tsang | July 7, 1959 |
| 2,918,369 | Dorrenbos | Dec. 22, 1959 |
| 2,953,561 | Dorrenbos | Sept. 20, 1960 |

FOREIGN PATENTS

| | | |
|---|---|---|
| 620,802 | Great Britain | Mar. 30, 1949 |
| 141,488 | Austria | Dec. 15, 1934 |
| 824,819 | Germany | July 8, 1949 |

OTHER REFERENCES

Venkataraman: The Chemistry of Synthetic Dyes, vol. II, page 1175, Academic Press Inc., N.Y., 1952.

UNITED STATES PATENT OFFICE
CERTIFICATE OF CORRECTION

Patent No. 3,090,782 May 21, 1963

Max Coenen et al.

It is hereby certified that error appears in the above numbered patent requiring correction and that the said Letters Patent should read as corrected below.

Column 3, lines 39 to 42, the seventh formula should appear as shown below instead of as in the patent:

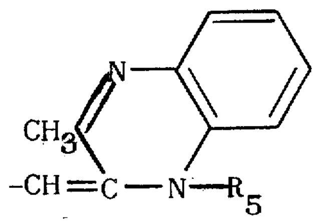

column 11, lines 11 to 21, Example 14 should appear as shown below instead of as in the patent:

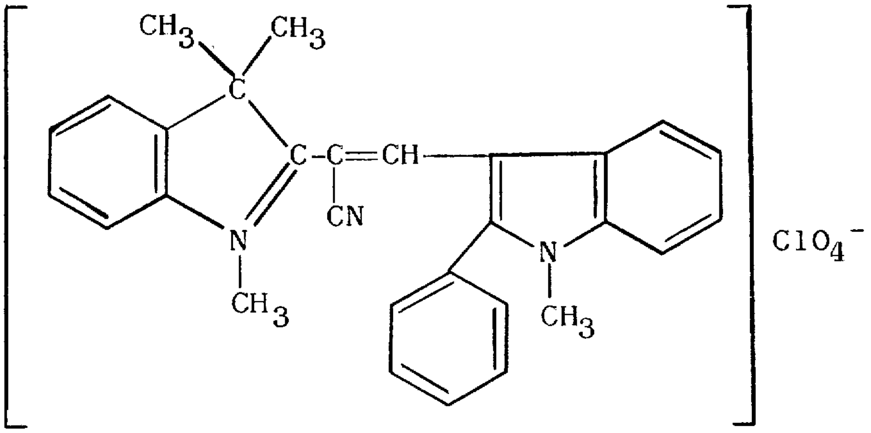

same column 11, lines 38 to 44, Example 15 should appear as shown below instead of as in the patent:

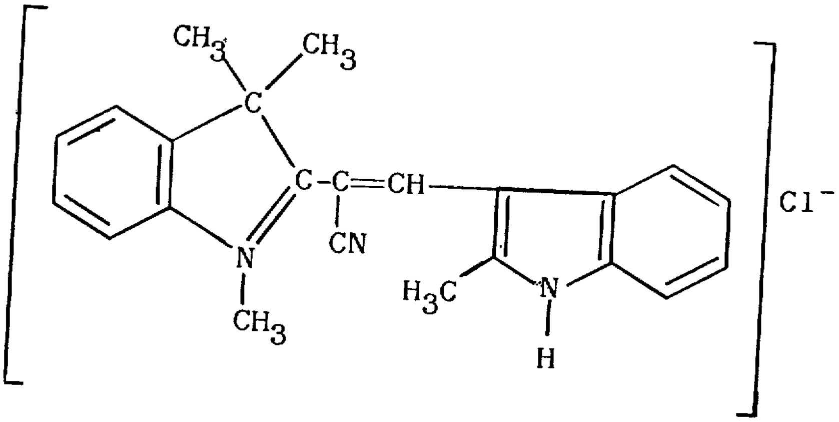

Signed and sealed this 23rd day of June 1964.

(SEAL)
Attest:

ERNEST W. SWIDER
Attesting Officer

EDWARD J. BRENNER
Commissioner of Patents